US012798535B2

(12) United States Patent
Nam et al.

(10) Patent No.: US 12,798,535 B2
(45) Date of Patent: Nov. 17, 2026

(54) REDUNDANCY DYNAMIC BRAKING SYSTEM

(71) Applicants: Hyundai Motor Company, Seoul (KR); Kia Corporation, Seoul (KR)

(72) Inventors: Ho Jung Nam, Suwon-Si (KR); Yoon Seong Jeon, Gwangmyeong-Si (KR); Jun Seok Park, Seoul (KR); Joo Beom Kim, Gwacheon-Si (KR); Jun Ho Park, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 186 days.

(21) Appl. No.: 18/384,117

(22) Filed: Oct. 26, 2023

(65) Prior Publication Data

US 2025/0010826 A1 Jan. 9, 2025

(30) Foreign Application Priority Data

Jul. 3, 2023 (KR) ........................ 10-2023-0085676

(51) Int. Cl.
*B60T 8/94* (2006.01)
*B60T 8/88* (2006.01)
(Continued)

(52) U.S. Cl.
CPC ................ *B60T 8/94* (2013.01); *B60T 8/885* (2013.01); *B60T 13/588* (2013.01);
(Continued)

(58) Field of Classification Search
CPC .......... B60T 8/94; B60T 8/885; B60T 13/588; B60T 2210/124; B60T 2220/04;
(Continued)

(56) References Cited

U.S. PATENT DOCUMENTS 6,439,674 B1 * 8/2002 Niino ....................... B60T 8/367 180/165
2019/0331221 A1 * 10/2019 Shirakawa .............. B60T 11/10
(Continued)

FOREIGN PATENT DOCUMENTS

CN 115123160 A * 9/2022 .............. B60T 8/171
KR 10-2021-0148633 A 12/2021
(Continued)

OTHER PUBLICATIONS

EPO machine translated description of CN-115123160-A. (Year: 2022).*

*Primary Examiner* — Navid Z. Mehdizadeh
*Assistant Examiner* — Shelley Marie Osterhout
(74) *Attorney, Agent, or Firm* — MORGAN, LEWIS & BOCKIUS LLP

(57) ABSTRACT

A redundancy dynamic braking system may include: a main braking force adjusting device configured to control a hydraulic braking device of a vehicle; a receiving unit configured to receive driving information of the vehicle; an electronic control braking device configured to be operated electrically to generate braking force; and an auxiliary braking force adjusting device configured to control the hydraulic braking device and the electronic control braking device, in an event of a failure in the main braking force adjusting device, wherein the auxiliary braking force adjusting device is configured to control the electronic control braking device by adjusting a magnitude and an application time of a current applied to the electronic control braking device based on an estimated target pressure using the driving information.

18 Claims, 7 Drawing Sheets

(51) Int. Cl.
*B60T 13/58* (2006.01)
*B60W 60/00* (2020.01)

(52) U.S. Cl.
CPC .... *B60W 60/0015* (2020.02); *B60T 2210/124* (2013.01); *B60T 2220/04* (2013.01); *B60T 2240/00* (2013.01); *B60T 2250/04* (2013.01); *B60T 2270/413* (2013.01)

(58) Field of Classification Search
CPC ............. B60T 2240/00; B60T 2250/04; B60T 2270/413; B60T 7/042; B60T 13/662; B60T 13/745; B60T 13/58; B60T 8/171; B60T 8/172; B60T 13/74; B60T 17/221; B60T 13/66; B60T 13/741; B60T 2270/402; B60W 60/0015; B60Y 2306/13; B60Y 2400/81
See application file for complete search history.

(56) References Cited

U.S. PATENT DOCUMENTS

| | | | | |
|---|---|---|---|---|
| 2020/0094801 | A1 | 3/2020 | Huff et al. | |
| 2021/0162971 | A1 | 6/2021 | Brenn et al. | |
| 2021/0370899 | A1* | 12/2021 | Hwang | B60L 7/26 |
| 2021/0394728 | A1* | 12/2021 | Yoo | B60T 8/4081 |
| 2022/0055592 | A1* | 2/2022 | Leiber | B60T 13/00 |
| 2024/0101088 | A1 | 3/2024 | Nam et al. | |

FOREIGN PATENT DOCUMENTS

| | | | |
|---|---|---|---|
| KR | 10-2021-0157936 | A | 12/2021 |
| KR | 10-2024-0043012 | A | 4/2024 |

* cited by examiner

REDUNDANCY DYNAMIC BRAKING SYSTEM

CROSS-REFERENCE TO RELATED APPLICATION(S)

The present application claims priority to Korean Patent Application No. 10-2023-0085676 filed on Jul. 3, 2023, the entire contents of which is incorporated herein for all purposes by this reference.

BACKGROUND OF THE PRESENT DISCLOSURE

Field of the Present Disclosure

The present disclosure relates to a redundancy dynamic braking system.

Description of Related Art

A braking device is a device for reducing or stopping the speed of a vehicle in motion, and may be said to be the most important device for vehicle safety. The braking device of a vehicle is a device that utilizes friction force to convert rotational energy of a tire wheel into thermal energy to reduce the speed of the vehicle and stop the vehicle.

The braking device of the vehicle is a device directly related to driver safety, and if the vehicle's braking controller fails, the vehicle cannot drive normally, and for safety, the vehicle must be stopped using an auxiliary braking means, such as an engine brake.

Accordingly, an auxiliary braking force adjusting device, which can control braking force of the vehicle in place of a main braking force adjusting device even if the main braking force adjusting device of the vehicle fails, and continuously and safely drive the vehicle without stopping the vehicle, is being developed.

The auxiliary braking force adjusting device can continue to drive the vehicle safely without stopping the vehicle using a hydraulic braking device and an electronic control braking device (e.g., an electronic parking brake, EPB).

On the other hand, the electronic parking braking device (e.g., the electronic parking brake. EPB) is slower in response than the hydraulic braking device and is not linear in pressure and decompression, and when excessive braking force is generated, the electronic parking braking device may include a problem of hindering driving stability, such as an occurrence of spins in the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a redundancy dynamic braking system for shortening a braking distance and improving deceleration simultaneously with securing driving stability of a vehicle.

According to an aspect of the present disclosure, a redundancy dynamic braking system may include: a main braking force adjusting device configured to control a hydraulic braking device of a vehicle; a receiving unit configured to receive driving information of the vehicle: an electronic control braking device configured to be operated electrically to generate braking force; and an auxiliary braking force adjusting device configured to control the hydraulic braking device and the electronic control braking device, in an event of a failure in the rain braking force adjusting device, wherein the auxiliary braking force adjusting device may control the electronic control braking device by adjusting a magnitude and an application time of a current applied to the electronic control braking device based on an estimated target pressure using the driving information.

The hydraulic braking device may include: a first hydraulic braking device provided in one of a front wheel and a rear wheel of the vehicle; and a second hydraulic braking device provided in another of the front wheel and the rear wheel of the vehicle, and the auxiliary braking force adjusting device may be configured to directly control braking hydraulic pressure of the first hydraulic braking device, in the event of the failure in the main braking force adjusting device.

The electronic control braking device may be provided in a wheel provided with at least the second hydraulic braking device, and the auxiliary braking force adjusting device may be configured to generate braking force using the first hydraulic braking device and the electronic control braking device, in the event of the failure in the main braking force adjusting device.

The driving information may include at least one of a rotation speed of a wheel provided in the vehicle, a driving speed of the vehicle, and a stroke of a brake pedal provided in the vehicle.

The electronic control braking device is an electronic parking brake (EPB).

Assuming that the vehicle is braked with the hydraulic braking device, the target pressure may be a total braking hydraulic pressure to be generated by the hydraulic braking device.

The driving information may include stroke information of a brake pedal, and the target pressure may be determined according to a stroke distance of the brake pedal.

The redundancy dynamic braking system may further include a storage unit in which a table including the target pressure recorded according to the stroke distance of the brake pedal is stored, wherein the auxiliary braking force adjusting device may be configured to determine the target pressure using the table including the target pressure recorded according to the stroke distance of the brake pedal stored in the storage unit.

The auxiliary braking force adjusting device is configured to start redundancy dynamic braking in response that the target pressure is equal to or greater than a predetermined reference target pressure, a driving speed of the vehicle is equal to or smaller than a predetermined reference driving speed, and a wheel speed sensor and the electronic control braking device are determined to be operating normally.

The auxiliary braking force adjusting device may be configured to terminate dynamic braking in response that the target pressure is lower than a predetermined reference target pressure, a driving speed of the vehicle is slower than a predetermined reference driving speed, a wheel speed sensor or the electronic control braking device is determined to have failed, or the vehicle is determined to be driving on a split road surface.

The auxiliary braking force adjusting device may be configured to operate the electronic control braking device using at least two redundancy dynamic braking modes of adjusting the magnitude and the application time of the current applied to the electronic control braking device.

The at least two redundancy dynamic braking modes may include: a first redundancy dynamic braking mode of continuously applying a current of a predetermined magnitude to the electronic control braking device; and a second redundancy dynamic braking mode of discontinuously applying a current applied to the electronic control braking device.

The auxiliary braking force adjusting device may be configured to operate the electronic control braking device in the first redundancy dynamic braking mode when the estimated target pressure is lower than a predetermined reference pressure, and operate the electronic control braking device in the second redundancy dynamic braking mode when the estimated target pressure is equal to or greater than the predetermined reference pressure.

The first redundancy dynamic braking mode may include: a plurality of operations of differently setting a magnitude of a current applied to the electronic control braking device based on the target pressure.

The second redundancy dynamic braking mode may include: a first operation of applying a current to the electronic control braking device by a predetermined target current; and a second operation of releasing the electronic control braking device during a predetermined release time, wherein the first operation and the second operation may be repeatedly performed.

According to another aspect of the present disclosure, a redundancy dynamic braking system may include: a main braking force adjusting device configured to control a hydraulic braking device of a vehicle: an electronic control braking device configured to be operated electrically to generate braking force: a receiving unit configured to receive driving information of the vehicle; an auxiliary braking force adjusting device configured to control the hydraulic braking device and the electronic control braking device, in an event of a failure in the main braking force adjusting device; and an autonomous driving controller configured to control autonomous driving of the vehicle based on the driving information, wherein the auxiliary braking force adjusting device may be configured for controlling the electronic control braking device by adjusting a magnitude and an application time of current applied to the electronic control braking device based on an estimated target pressure.

The target pressure may be estimated based on required deceleration received from the autonomous driving controller, and assuming that the vehicle is braked with the hydraulic braking device, the target pressure may be a total braking hydraulic pressure to be generated by the hydraulic braking device provided in the vehicle.

The auxiliary braking force adjusting device may be configured to operate the electronic control braking device using at least two redundancy dynamic braking modes of adjusting a magnitude and application time of current applied to the electronic control braking device, wherein the at least two redundancy dynamic braking modes may include: a first redundancy dynamic braking mode of continuously applying current having a preset magnitude to the electronic control braking device when the estimated target pressure is lower than a preset pressure, and a second redundancy dynamic braking mode of discontinuously applying a current applied to the electronic control braking device when the estimated target pressure is equal to or greater than the preset pressure.

The first redundancy dynamic braking mode may include: a plurality of operations in which a magnitude of current applied to the electronic control braking device is set differently based on the target pressure.

The second redundancy dynamic braking mode may include: a first operation of applying current to the electronic control braking device by a preset target current; and a second operation of releasing the electronic control braking device during a predetermined release time, wherein the first operation and the second operation may be repeatedly performed.

According to an exemplary embodiment of the present disclosure, a redundancy dynamic braking system can reduce a braking distance and improve deceleration simultaneously with securing driving stability of a vehicle, by controlling an electronic control braking device by applying different redundancy dynamic braking modes.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
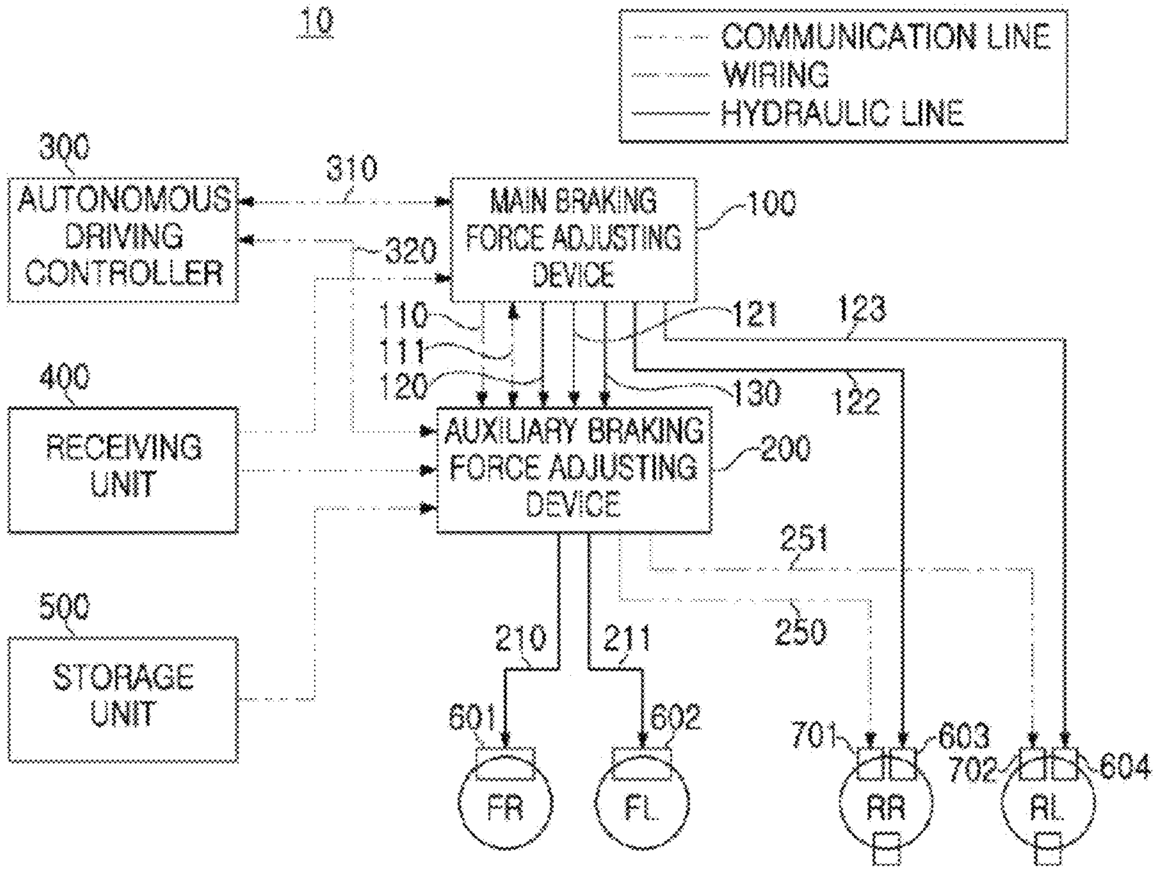
FIG. 1 is a block diagram of a redundancy dynamic braking system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the present disclosure may make various changes and have various exemplary embodiments of the present disclosure, specific embodiments thereof will be described and illustrated in the drawings. However, the exemplary embodiments are not intended for limiting the present disclosure. The idea of the present disclosure should be construed to extend to any alterations, equivalents and substitutes besides the accompanying drawings.

It will be understood that although the terms first, second, etc., may be used herein to describe various elements, these elements should not be limited by these terms. These terms are generally only used to distinguish one element from another. For example, a first element could be termed a second element, and similarly, a second element could be termed a first element, without departing from the scope of the present disclosure. The term of and/or encompasses a combination of plural items or any one of the plural items.

The term used herein is for describing various exemplary embodiments only and is not intended to be limiting of the present disclosure. The singular also includes the plural unless stated otherwise in the phrase. It will be further understood that the terms "comprises," "including," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein include the same meaning as commonly understood by one of ordinary skill in the art to which example embodiments of the present disclosure belong. It will be further understood that the terms, such as those defined in commonly used dictionaries, should be interpreted as having meanings that are consistent with their meanings in the context of the relevant art and will not be interpreted in an idealized or overly formal sense unless so defined herein.

Hereinafter, various exemplary embodiments of the present disclosure will be described with reference to the appended drawings.

FIG. 1 is a block diagram of a redundancy dynamic braking system 10 according to an exemplary embodiment of the present disclosure.

Referring to FIG. 1, a redundancy dynamic braking system 10 may include a main braking force adjusting device 100, an auxiliary braking force adjusting device 200, and a receiving unit 400.

Here, the redundancy dynamic braking system 10 may be a braking system configured to generate braking force using the auxiliary braking force adjusting device 200, in an event of a failure in the main braking force adjusting device 100.

Wien the main braking force adjusting device 100 fails, the auxiliary braking force adjusting device 200 may be configured to generate braking force by controlling some of hydraulic braking devices 601, 602, 603 and 604) and electronic control braking devices 701 and 702. The redundancy dynamic braking system 10 may be a braking system for changing a magnitude of the braking force generated by the electronic control braking devices 701 and 702 according to the braking force required for the vehicle.

The main braking force adjusting device 100 may perform braking by receiving a signal related to a brake pedal stroke reflecting a user's braking intention via the receiving unit 400 and controlling brake hydraulic pressure of a front wheel and a rear wheel of the vehicle.

Here, the main braking force adjusting device 100 may adjust braking hydraulic pressure based on information such as an adjustment amount and adjustment speed of a brake pedal through a sensor attached to the brake pedal.

The main braking force adjusting device 100 may be an integrated electric booster, but the present disclosure is not limited thereto.

In an exemplary embodiment of the present disclosure, the main braking force adjusting device 100 may include a processor.

Furthermore, the main braking force adjusting device 100 may include first, second, third and fourth main hydraulic lines 120, 121, 122 and 123 connected to the front wheel and the rear wheel of the vehicle. Each of the main hydraulic lines 120, 121, 122 and 123 may be connected to hydraulic braking devices 601, 602, 603 and 604 provided in left and right wheels FL, FR of the front wheel of the vehicle and left and right wheels RL, RR of the rear wheel thereof, respectively.

Here, the hydraulic braking device 601, 602, 603 and 604 may be a device configured for generating braking force by adjusting a brake disk or a brake drum through hydraulic pressure.

The main braking force adjusting device 100 may be connected to the hydraulic braking devices 601, 602, 603 and 604 via the auxiliary braking force adjusting device 200. Referring to FIG. 1, the main braking force adjusting device 100 may be connected to the auxiliary braking force adjusting device 200 through the first main hydraulic line 120 and the second main hydraulic line 121, and the auxiliary braking force adjusting device 200 may be connected to the hydraulic braking devices 601 and 602 on left and right sides FR and FL of the front wheels through redundancy hydraulic lines 210 and 211.

The first main hydraulic line 120 of the main braking force adjusting device 100 may be connected to the hydraulic braking devices 601 on the right side FR of the front wheel through the first redundancy hydraulic line 210 of the auxiliary braking force adjusting device 200, and the second main hydraulic line 121 of the main braking force adjusting device 100 may be connected to the hydraulic braking device 602 on the left side FL of the front wheel through the first redundancy hydraulic line 211 of the auxiliary braking force adjusting device 200.

Furthermore, the main braking force adjusting device 100 may be connected to the hydraulic braking device 603 on the right side RR of the rear wheel through the third main hydraulic line 122 and may be connected to the hydraulic braking device 604 on the left side RL of the rear wheel through the fourth main hydraulic line 123.

Here, the main braking force adjusting device 100 is connected to the hydraulic braking devices 601 and 602 of the front wheel and the auxiliary braking force adjusting device 200, but the present disclosure is not limited thereto, and the main braking force adjusting device 100 may be connected to the hydraulic braking devices 603 and 604 of the rear wheel via the auxiliary braking force adjusting device 200, and the main braking force adjusting device 100 and the auxiliary braking force adjusting device 200 are not limited to a specific connection structure. In the instant case, the hydraulic braking devices 601 and 602 of the front wheels may be directly connected to the main braking force adjusting device 100.

A hydraulic braking device connected to the main braking force adjusting device 100 via the auxiliary braking force adjusting device 200 may be referred to as a first hydraulic braking device 601 or 602, and a hydraulic braking device directly connected to the main braking force adjusting device 100 may referred to as a second hydraulic braking device 603 or 604.

The auxiliary braking force adjusting device 200 may be configured to determine whether the main braking force adjusting device 100 fails, and when the main braking force adjusting device 100 fails, the auxiliary braking force adjusting device 200 may be configured for controlling the vehicle's braking force by replacing the main braking force adjusting device 100.

The auxiliary braking force adjusting device 200 may be connected to the first hydraulic braking devices 601 and 602 through the first redundancy hydraulic lines 210 and 211, and may be configured for controlling the braking hydraulic pressure of the first hydraulic braking devices 601 and 602 to generate the braking force.

Furthermore, the auxiliary braking force adjusting device 200 may be configured for controlling wheels provided with the second hydraulic braking devices 603 and 604 that are not connected by hydraulic lines, using electrically connected electronic control braking devices 701 and 702.

The auxiliary braking force adjusting device 200 may be connected to the electronic control braking device 701 and a first electronic control braking device control line 250 on the right side of the rear wheel, and may be connected to the electronic control braking device 702 and a second electronic adjusting device control line 251.

The auxiliary braking force adjusting device 200 may be configured to generate braking force by controlling the electronic control braking devices 701 and 702 provided in the rear wheels through the first electronic control braking device control line 250 and the second electronic control braking device control line 251. The electronic control braking devices 701 and 702 may be actuators including electric motors, and may be configured to generate braking force by operating the actuators according to electrical signals. Furthermore, the auxiliary braking force adjusting device 200 may be configured for controlling a magnitude and an application time of current applied to the electronic control braking devices 701 and 702.

Here, the electrically connected electronic control braking devices 701 and 702 may be electric parking brakes (EPB).

The receiving unit 400 may receive information on a driving state of the vehicle. For example, the receiving unit 400 may receive information on a driving state, such as a stoke size of a brake pedal of the vehicle, wheel speed and wheel slip rate information of each wheel, driving speed information of the vehicle, failure of a wheel speed sensor, and failure of the electronic control braking devices 701 and 702.

The receiving unit 400 may be connected to sensors provided in the vehicle using a network provided in the vehicle to receive information on the driving state of the vehicle. For example, the receiving unit 400 may receive stroke information of the brake pedal from a brake pedal sensor using a Controller Area Network (CAN) network of the vehicle.

Furthermore, the auxiliary braking force adjusting device 200 may receive a stroke signal of the brake pedal reflecting the user's braking intension through the receiving unit 400 and may be configured for controlling the first hydraulic braking devices 601 and 602 to generate the braking force.

The auxiliary braking force adjusting device 200 may adjust braking hydraulic pressure of the first hydraulic braking devices 601 and 602, based on operation information of the brake pedal received through the receiving unit 400.

In an exemplary embodiment of the present disclosure, the auxiliary braking force adjusting device 200 may include a processor.

Here, the receiving unit 400 may be connected to the main braking force adjusting device 100 and the auxiliary braking force adjusting device 200, respectively. The receiving unit 400 may transmit driving information received to the main braking force adjusting device 100 when the main braking force adjusting device 100 operates normally, and may transmit driving information received to the auxiliary braking force adjusting device 200 when the main braking force adjusting device 100 fails.

Accordingly, even if the main braking force adjusting device 100 fails, the auxiliary braking force adjusting device 200 may receive the driving information through the receiving unit 400 to control the braking force.

Furthermore, the auxiliary braking force adjusting device 200 may be connected to the main braking force adjusting device 100 via the braking oil supply line 130. The auxiliary braking force adjusting device 200 may receive braking oil that can generate hydraulic pressure through a separate braking oil supply line 130, through which hydraulic pressure may be controlled.

Here, the braking oil supply line 130 is a line branched from a braking oil reservoir tank included in the main braking force adjusting device 100, and may be a separate line for supplying braking oil to the auxiliary braking force adjusting device 200.

However, the present disclosure is not limited to this, and a separate braking oil reservoir tank for supplying the braking oil may be provided.

The redundancy dynamic braking system 10 may further include an autonomous driving controller 300 and a storage unit 500.

The autonomous driving controller 300 may detect a driving situation of the vehicle or a situation of a road during the driving of the vehicle via the receiving unit 400, and control the vehicle to accelerate, decelerate, and stop, using the main braking force adjusting device 100 or the auxiliary braking force adjusting device 200.

The autonomous driving controller 300 may be connected to the main braking force adjusting device 100 through a first autonomous driving control line 310, and may be connected to the auxiliary braking force adjusting device 200 through a second autonomous driving control line 320.

Accordingly, when the main braking force adjusting device 100 operates normally, the autonomous driving controller 300 may autonomously drive by exchanging information with the main braking force adjusting device 100 through the first autonomous driving control line 310.

Furthermore, even in an event of a failure in the main braking force adjusting device 100, the autonomous driving controller 300 may autonomously drive by exchanging information through the auxiliary braking force adjusting device 200 through the second autonomous driving control line 320.

The autonomous driving controller 300 may be a highway driving pilot (HDP), but the present disclosure is not limited thereto, and the autonomous driving controller 300 may be a device configured for controlling a vehicle without a driver's control.

The autonomous driving controller 300 may be configured to determine required deceleration required for preventing a vehicle collision or driving safely based on the information received through the receiving unit 400. The autonomous driving controller 300 may transmit the determined required deceleration to the auxiliary braking force adjusting device 200, and the auxiliary braking force adjusting device 200 may be configured for controlling the hydraulic braking devices 601, 602, 603 and 604 and the electronic control braking devices 701 and 702 based on the required deceleration and may be configured to generate the braking force.

Meanwhile, the redundancy dynamic braking system 10 may be operated even when the autonomous driving controller 300 is omitted.

The storage unit 500 may store a preset table. For example, the storage unit 500 may store a table in which a magnitude of the target pressure according to the brake pedal stroke is stored. The auxiliary braking force adjusting device 200 may be configured to determine the target pressure using stroke information of the brake pedal received through the receiving unit 400 and the table stored in the storage unit 500.

Furthermore, the storage unit 500 may store a table including a preset magnitude or a preset release time of current applied to the electronic control braking devices 701 and 702 according to a plurality of redundancy dynamic braking modes Here, detailed descriptions of the target pressure, the redundancy dynamic braking mode, the release time, and the stored table will be described below.

The storage unit 500 is a recording medium suitable for storing the preset table, and may include, for example magnetic media (Magnetic Media) such as a hard disk, a floppy disk and a magnetic tape, a Compact Disk Read Only Memory (CD-ROM), optical media such as a digital video disk (DVD), magneto-optical media such as a floppy disk, a flash memory or an erasable programmable ROM (EPROM), or a semiconductor memory such as SSD manufactured based thereon.

The components of the redundancy dynamic braking system 10 may be connected to each other by wired or wirelessly to exchange information. For example, the information may be exchanged using communication means such as Ethernet, media-oriented systems transport (MOST), Flexray, a Controller Area Network (CAN), a local interconnect network: (LIN), the Internet, LTE, 5G, Wi-Fi, Bluetooth, Near Field Communication (NFC), Zigbee®, and Radio Frequency (RF).

Here, the main braking force adjusting device 100 and the auxiliary braking force adjusting device 200 may be connected through additional wires in addition to a common communication means provided in the vehicle described above.

For example, the main braking force adjusting device 100 and the auxiliary braking force adjusting device 200 may have two lines connected to each other: CAN and separate wiring. The main braking force adjusting device 100 may transmit a certain signal to the auxiliary braking force adjusting device 200 through the CAN, and the auxiliary braking force adjusting device 200 may confirm whether the main braking force adjusting device 100 fails through a change in the received signal.

Furthermore, the main braking force adjusting device 100 may apply certain voltage to the auxiliary braking force adjusting device 200 through wiring, and the auxiliary braking force adjusting device 200 may be configured to determine that the main braking force adjusting device 100 has failed when the received voltage decreases by a certain level or less.

Here, a communication line for checking the failure of the main braking force adjusting device 100 and the auxiliary braking force adjusting device 200 may be referred to as a first failure check line 111, and an additional wiring connection line may be referred to as a second failure check line 110. Through the double-connected failure check lines 110 and 111, it may be possible to more clearly check whether the main braking force adjusting device 100 has failed even if one of the failure check lines does not operate normally.

On the other hand, when it is determined that the main braking force adjusting device 100 has failed, the auxiliary braking force adjusting device 200 may drive the vehicle in a redundancy braking mode of controlling the braking of the vehicle.

The auxiliary braking force adjusting device 200 may be configured for controlling the braking force of the front wheel FR, FL and the rear wheel RR. RL of the vehicle using the electronic control braking devices 701 and 702 provided in wheels provided with the first hydraulic braking devices 601 and 602 and the second hydraulic braking devices 603 and 604.

On the other hand, unlike the hydraulic braking devices 601, 602, 603 and 604 for immediately generating the braking force according to hydraulic pressure, as the electronic control braking devices 701 and 702 drive an actuator according to an electrical signal to generate the braking power, they may cause a braking delay between a braking start signal and an occurrence of the braking force, due to the time at which the actuator is driven by receiving the braking signal.

Figure 6:
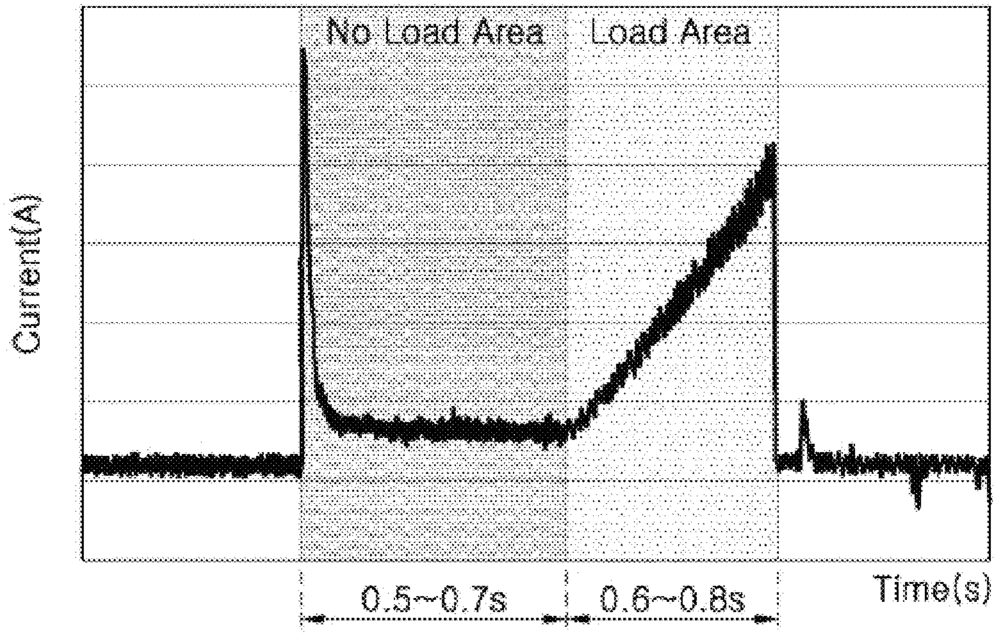
FIG. 6 is a view exemplarily illustrating a relationship between time and a current according to an operation of the electronic control braking device.

FIG. 6 is a view exemplarily illustrating a relationship between time and current according to operations of the electronic control braking devices 701 and 702. Referring to FIG. 6, when current is applied to the actuator, the electronic control braking device 701 and 702 enters a load area that generates braking force through a no-load area.

Here, the no load area is an area generated in a process of bringing a brake pad into contact with a caliper, and may be an area in which the electronic control braking devices 701 and 702 start to perform operations thereof but do not generate braking force. The no-load area may be caused by a gap between a piston and a brake pad provided in the electronic control braking devices 701 and 702, or an air gap between a brake drum and a liner.

As illustrated in FIG. 6, the electronic control braking devices 701 and 702 may include a braking delay between the braking start signal and the occurrence of the braking force due to the time at which the actuator is driven by receiving the braking signal, and may have slower braking response than the hydraulic braking devices 601, 602, 603 and 604.

Figure 2:
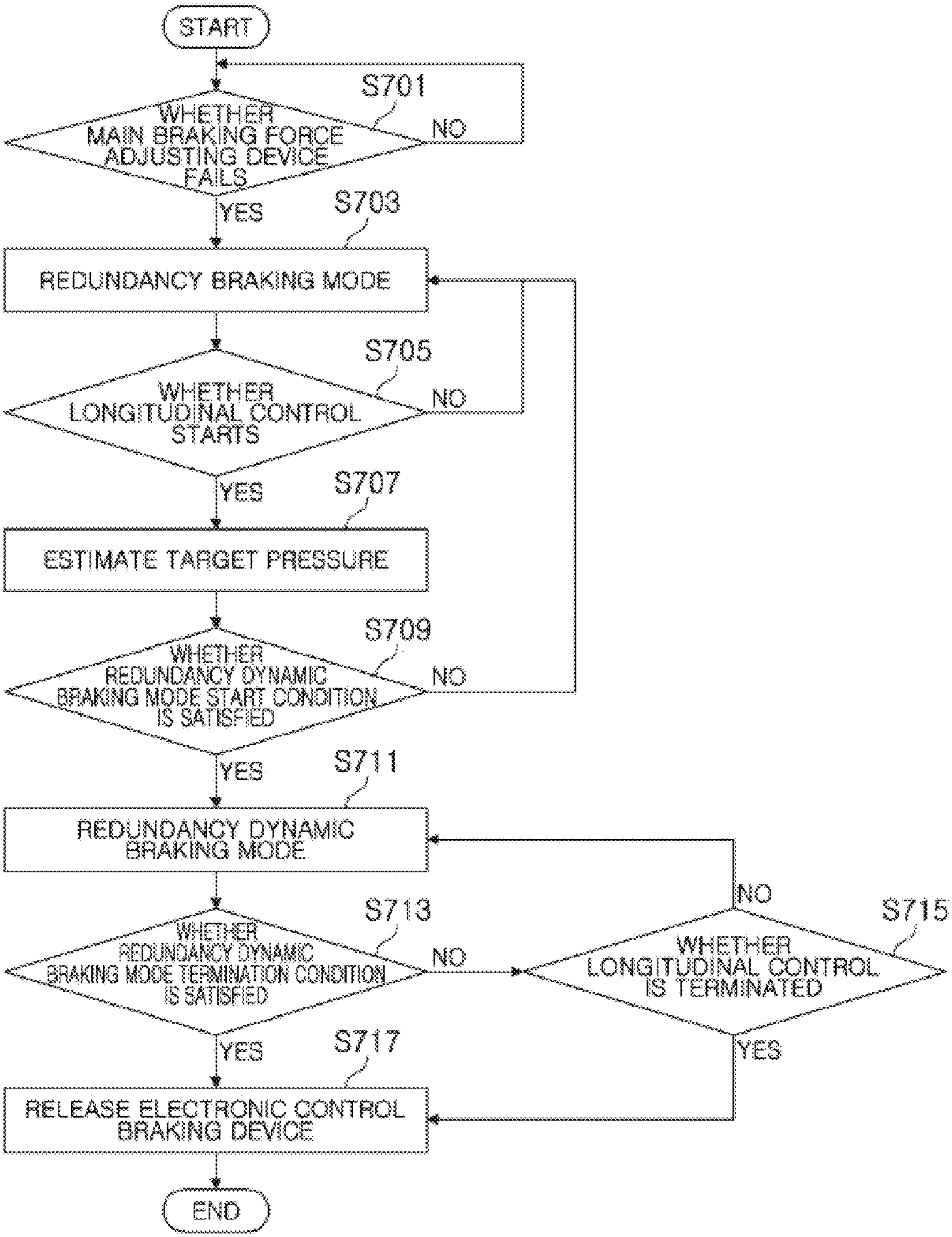
FIG. 2 is a flowchart of a redundancy dynamic braking system according to an exemplary embodiment of the present disclosure.
Figure 3:
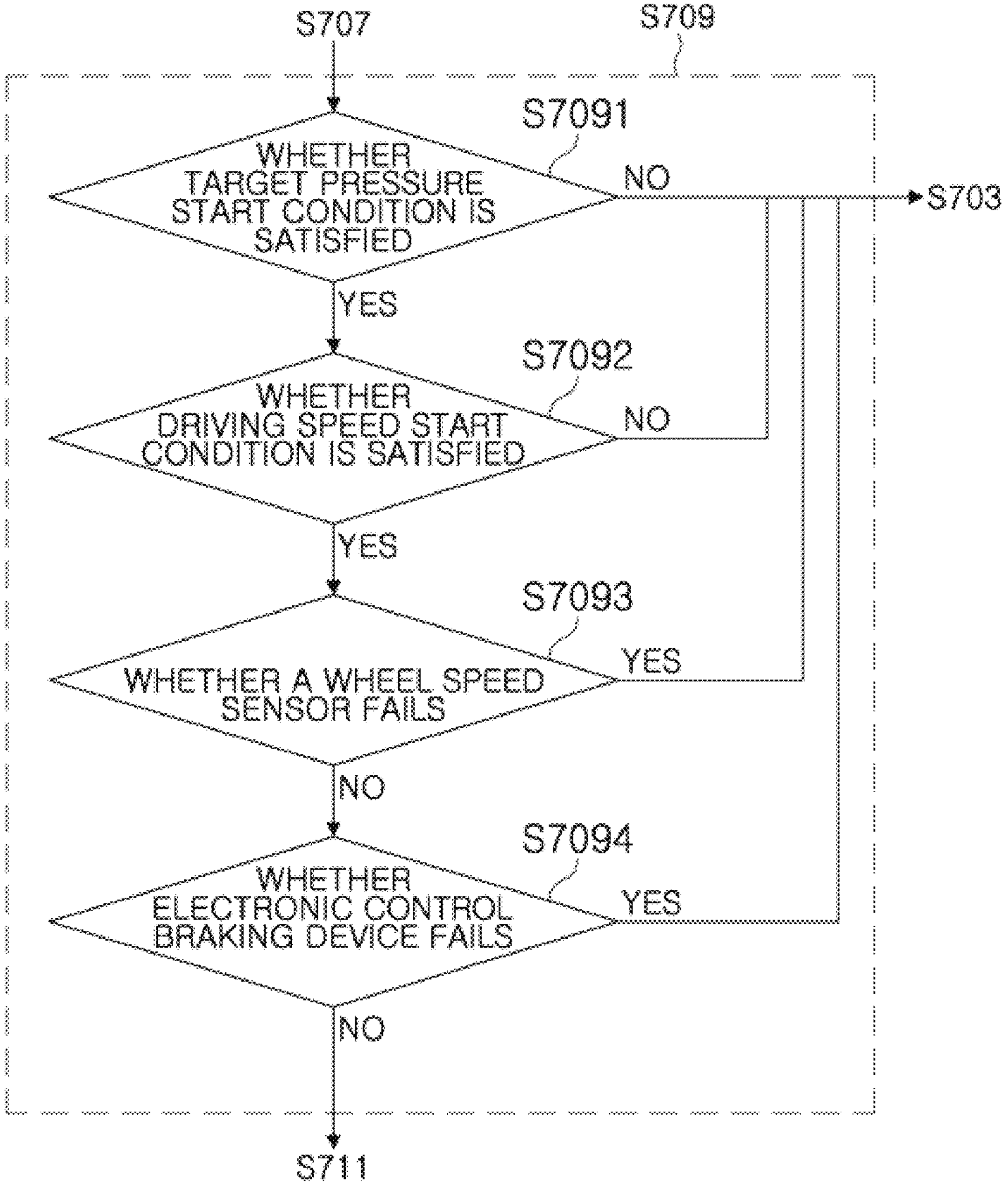
FIG. 3 is a detailed flowchart of operation S709 according to an exemplary embodiment of the present disclosure.
Figure 4:
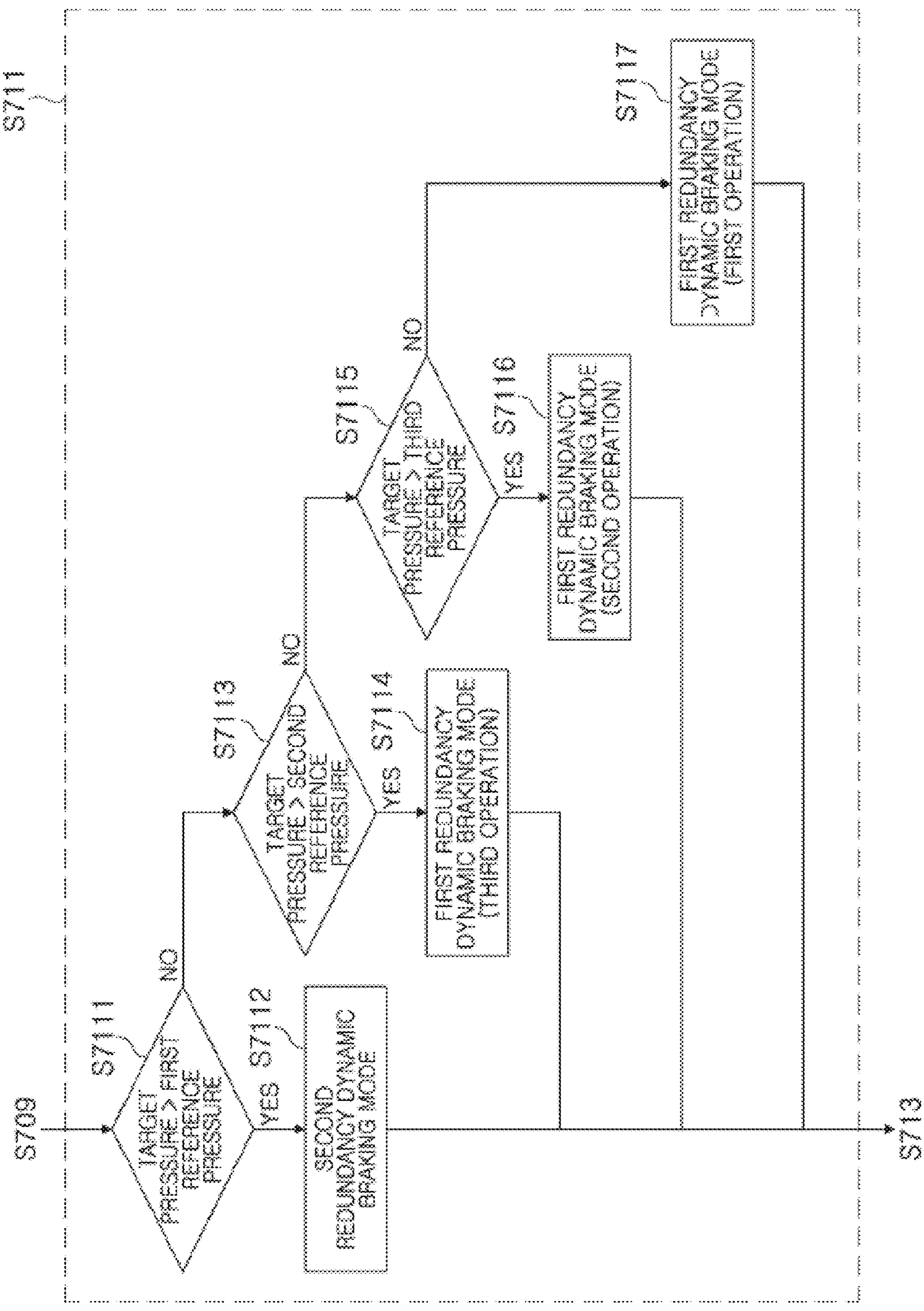
FIG. 4 is a detailed flowchart of operation S711 according to an exemplary embodiment of the present disclosure.
Figure 5:
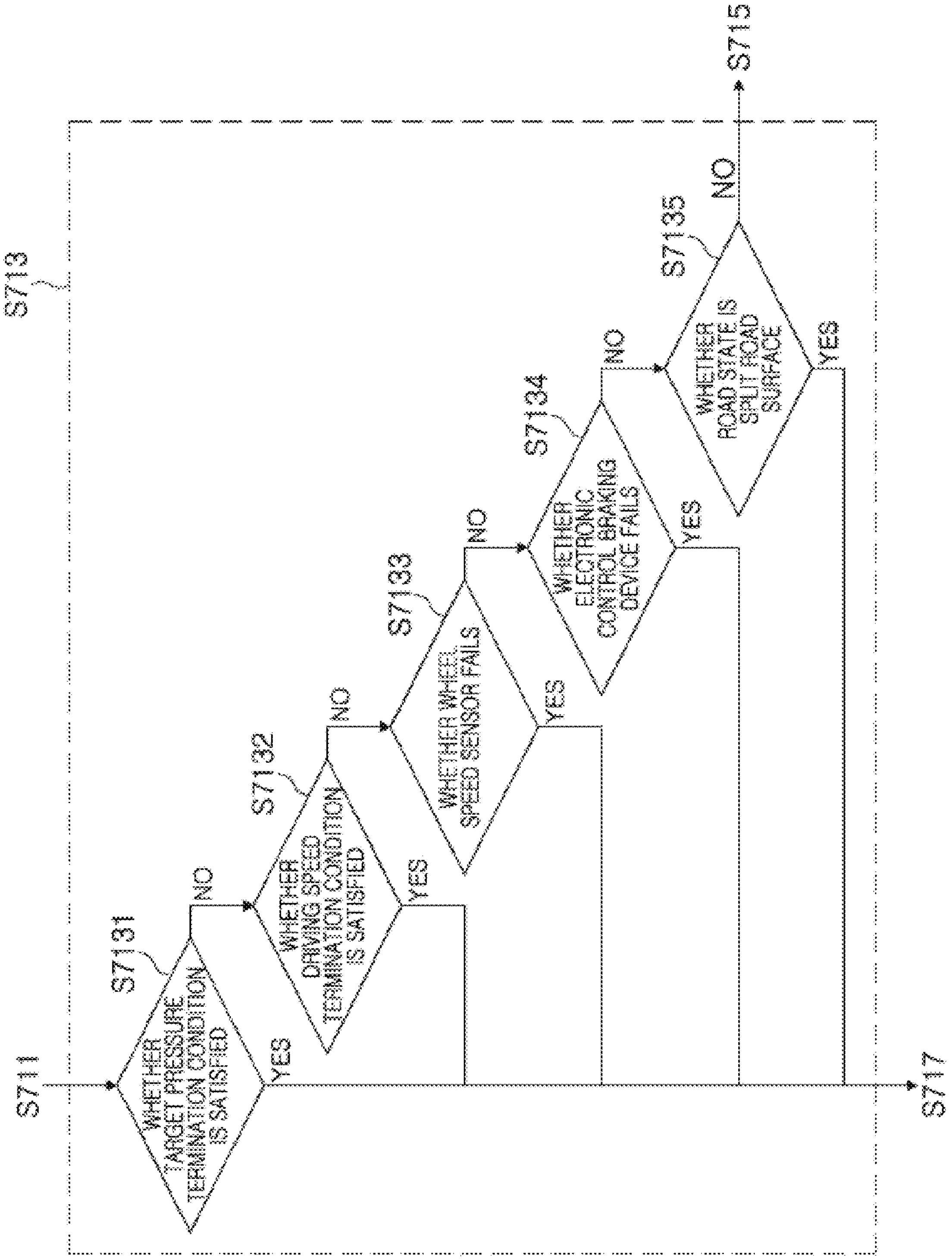
FIG. 5 is a detailed flowchart of operation S713, according to an exemplary embodiment of the present disclosure.

FIG. 2 is a flowchart of a redundancy dynamic braking system 10 according to an exemplary embodiment of the present disclosure, FIG. 3 is a detailed flowchart of operation S709 according to an exemplary embodiment of the present disclosure, FIG. 4 is a detailed flowchart of operation S711 according to an exemplary embodiment of the present disclosure, and FIG. 5 is a detailed flowchart of operation S713 according to an exemplary embodiment of the present disclosure.

Referring to FIG. 2, an auxiliary braking force adjusting device 200 may confirm whether a main braking force adjusting device 100 fails through a first failure check line 111 and a second failure check line 110 (S701).

Here, the auxiliary braking force adjusting device 200 may be configured to determine that the main braking force adjusting device 100 fails even when the failure of the main braking force adjusting device 100 is determined only through one of the first failure check line 111 or the second failure check line 110.

When the main braking force adjusting device 100 is determined to have failed, the auxiliary braking force adjusting device 200 may drive the vehicle in a redundancy braking mode of controlling the braking of the vehicle instead of the main braking force adjusting device 100 (S703).

In the redundancy braking mode, the auxiliary braking force adjusting device 200 may be configured for controlling braking force of the front and rear wheels of the vehicle using first hydraulic braking devices 601 and 602 and electronic control braking devices 701 and 702.

The auxiliary braking force adjusting device 200 may be configured for controlling the braking force of the front and rear wheels of the vehicle using the electronic control braking devices 701 and 702 electrically connected to the first hydraulic braking devices 601 and 602 connected to the auxiliary braking force adjusting device 200 through hydraulic lines, stably maintaining a driving state.

The auxiliary braking force adjusting device 200 may confirm whether longitudinal control of the vehicle starts (S705). The auxiliary braking force adjusting device 200 may confirm whether the longitudinal control of the vehicle has started through whether a driver has operated a brake pedal.

The auxiliary brake force adjusting device 200 may receive brake pedal stroke information received through a receiving unit 400, and the auxiliary brake force adjusting device 200 may be configured to determine that the longitudinal control has started when a brake pedal stroke occurs.

Furthermore, the auxiliary braking force adjusting device 200 may confirm whether the longitudinal control has started through whether there is a braking request from an autonomous driving controller 300. When the auxiliary braking force adjusting device 200 receives the braking request from the autonomous driving controller 300, it may determine that the longitudinal control has started.

When the driver manipulates the brake pedal or there is the braking request from the autonomous driving controller 300, the auxiliary braking force adjusting device 200 may estimate target pressure (S707).

Here, the target pressure may refer to a total braking hydraulic pressure that needs to be generated using the hydraulic device provided in the vehicle to brake the vehicle in a desired state, assuming that all the hydraulic devices provided in the vehicle operate normally.

The auxiliary braking force adjusting device 200 may estimate the target pressure differently according to a subject controlling the vehicle. For instance, the auxiliary braking force adjusting device 200 may estimate the target pressure by distinguishing between a case in which the vehicle is controlled by the driver, as the subject controlling the vehicle and a case in which the vehicle is controlled through the autonomous driving controller 300, as the subject controlling the vehicle.

When the driver controls the vehicle, the auxiliary braking force adjusting device 200 may estimate the target pressure using a table on the target pressure according to a stroke distance of the brake pedal preset and stored in a storage unit 500.

A table related to the target pressure according to the stroke distance of the brake pedal according to an exemplary embodiment of the present disclosure may be illustrated in Table 1 below.

TABLE 1

| Pedal Stroke (mm) | Target Pressure(bar) |
|---|---|
| 3 | 0.5 |
| 5 | 0.5 |
| 7.5 | 1.1 |
| 11.5 | 2.2 |
| 17.5 | 5.1 |
| 23.5 | 8.6 |
| 29.5 | 13.0 |
| 35.5 | 19.0 |
| 41.5 | 27.4 |
| 47.5 | 39.4 |
| 53.5 | 56.1 |
| 59.5 | 78.3 |
| 65.5 | 106.6 |
| 71.5 | 141.2 |
| 80 | 200.0 |

Here, the table regarding the target pressure according to the stroke distance of the brake pedal is a table preset through actual driving or simulation, and may be variously changed depending on the type of vehicles, a wheel size, an applied tire, and the like.

Furthermore, for a non-preset stroke value of the brake pedal, the target pressure of the non-preset stroke of the brake pedal may, be estimated using a set stroke value of the brake pedal and linear interpolation.

When the autonomous driving controller 300 controls the vehicle, the auxiliary braking force adjusting device 200 may estimate the target pressure based on the required deceleration received from the autonomous driving controller 300.

The auxiliary braking force adjusting dev ice 200 may estimate the target pressure using, Equation 1 exemplarily expressed below.

$$P_{target} = \frac{W \times R}{TF_{frt} + TF_{rr}} \times a \qquad \langle\text{Equation 1}\rangle$$

Here, $P_{target}$ is an estimated target pressure (bar), W is a weight (kg) of the vehicle. R is a dynamic radius (in) of a tire, $TF_{frt}$ is a torque factor (Nm/bar) of a front wheel, $TF_{rr}$ is a torque factor (Nm/bar) of a rear wheel, and a is required deceleration (m/s$^2$) received from the autonomous driving controller 300. Here, the torque factor may refer to a braking torque generated when braking hydraulic pressure of 1 bar is generated in the hydraulic braking device.

The auxiliary braking force adjusting device 200 may confirm whether a redundancy dynamic braking mode start condition is satisfied (S709).

Referring to FIG. 3, based on a target pressure start condition, a driving speed start condition, failure of a wheel speed sensor, and failure of the electronic control braking devices 701 and 702, the auxiliary braking force adjusting device 200 may confirm whether the redundancy dynamic braking mode start condition is satisfied.

The auxiliary braking force adjusting device 200 may start the redundancy dynamic braking mode when all conditions for starting the redundancy dynamic braking mode are satisfied.

The auxiliary braking force adjusting device 200 may confirm whether the target pressure start condition is satisfied (S7091). The target pressure start condition may be determined to be satisfied when the estimated target pressure is equal to or greater than a preset target pressure (e.g., 10 bars).

Here, the preset target pressure start condition (e.g., 10 bars) is a preset and stored value and may be a magnitude which may stably satisfy the target pressure with the first hydraulic braking devices 601 and 602.

Furthermore, the preset target pressure start condition (e.g., 10 bars) may be the pressure at which the first hydraulic braking devices 601 and 602 may satisfy the target pressure before operating the electronic control braking devices 701 and 702.

The first hydraulic braking devices 601 and 602 may immediately generate braking force, and the electronic control braking devices 701 and 702 may include a certain delay time until the braking force occurs.

Accordingly, the first hydraulic braking devices 601 and 602 may be configured to generate a target pressure less than a preset target pressure start condition (e.g., 10 bars) before operating the electronic control braking devices 701 and 702.

In other words, below a preset target pressure (e.g., 10 bars), sufficient braking force may be generated by the first hydraulic braking devices 601 and 602 before operating the electronic control braking devices 701 and 702, and accordingly, it may be meaningless to generate the braking force using the electronic control braking devices 701 and 702.

The target pressure start condition may be set to various sizes according to the type of vehicles.

The auxiliary braking force adjusting device 200 may confirm whether a driving speed start condition is satisfied (S7092). When the speed of the vehicle increases by a certain speed or more, the stability of the vehicle may be reduced due to the limitation of the reactivity of the electronic control braking devices 701 and 702.

The electronic control braking devices 701 and 702 may be less reactive than the hydraulic braking systems 601, 602, 603 and 604, and accordingly, when the redundancy dynamic braking mode is performed at a predetermined speed or higher, there may be a risk that the electronic control braking devices 701 and 702 may cause a spin of the vehicle.

Accordingly, the auxiliary braking force adjusting device 200 may receive the driving speed the vehicle from the receiving unit 400, and when the received driving speed is less than a preset driving speed start condition (e.g., 80 kilometers per hour (km/h), the auxiliary braking force adjusting device 200 may perform the redundancy dynamic braking mode.

Here, the preset driving speed start condition (e.g., 80 km/h) is a value determined through test driving and may be set differently depending on the vehicle.

The auxiliary braking force adjusting device 200 may confirm whether a wheel speed sensor has failed (S7093).

The wheel speed sensor may be used not only to estimate the driving speed of the vehicle, but also to determine a split road surface of a redundancy dynamic braking mode termination condition described below. Accordingly, when the wheel speed sensor fails, the redundancy dynamic braking may not be started.

The auxiliary braking force adjusting device 200 may confirm whether the electronic control braking devices 701 and 702 have failed (S7094).

Since the redundancy dynamic braking system 10 essentially utilizes the electronic control braking devices 701 and 702, it may confirm whether the electronic control braking devices 701 and 702 operate normally. The redundancy dynamic braking system 10 may confirm whether an actuator of the electronic control braking devices 701 and 702 operates normally.

On the other hand, the redundancy dynamic braking mode start condition illustrated in FIG. 3 may be determined in an order of operations S7091, S7092, S7093 and S7094, but the present disclosure is not limited thereto, and the redundancy dynamic braking mode initiation condition may be determined by changing the determination order of operations S7091, S7092, S7093 and S7094, or by placing the order of operations in parallel at the same time.

The auxiliary braking force adjusting device 200 may be configured for controlling braking of the vehicle in the redundancy dynamic braking mode (S711).

Referring to FIG. 4, the auxiliary braking force adjusting device 200 may be configured to determine a redundancy dynamic braking mode based on target pressure.

The redundancy dynamic braking mode may include at least two redundancy dynamic control modes depending on an operation method of the electronic control braking devices 701 and 702. Here, one redundancy dynamic control mode may be referred to as a first redundancy dynamic control mode, and the other redundancy dynamic control mode may be referred to as a second redundancy dynamic control mode.

The first redundancy dynamic control mode may uniformly control wheels provided with the electronic control braking devices 701 and 702 by applying a constant current to an actuator of the electronic control braking devices 701 and 702.

The second redundancy dynamic control mode may include a first operation of applying a current to the actuator of the electronic control braking devices 701 and 702 by a target current, and a second operation of releasing the electronic control braking devices 701 and 702 for a predetermined release time after the applied current reaches the target current.

For example, the second redundancy dynamic control mode may be configured for controlling the electronic control braking devices 701 and 702 using a preset and stored target current and release time. The preset target current and release time may be shown in Table 2 below.

TABLE 2

| Second Redundancy Dynamic Control Mode | |
|---|---|
| Target Current (ampere, A) | 3.5 |
| Release Time (millisecond, ms) | 100 |

The second redundancy dynamic control mode may increase current applied to the electronic control braking devices 701 and 702 by 3.5 A (a first operation) and release the electronic control braking devices 701 and 702 for 100 ms when the current reaches 3.5 A (a second operation), and may repeatedly perform the first operation and the second process, thus generating braking force.

In the first redundancy dynamic control mode, when the braking force is generated by controlling the electronic control braking devices 701 and 702 at a high current, there may be a problem in that the stability of the vehicle is reduced due to an occurrence of spins in the vehicle, and the like.

Accordingly, when it is necessary to apply a high current to the electronic control braking devices 701 and 702, the auxiliary braking force adjusting device 200 may repeatedly perform an operation of operating by the target current and an operation of releasing the electronic control braking devices 701 and 702, as in the second redundancy dynamic control mode, securing sufficient braking force and securing stability of the vehicle.

The auxiliary braking force adjusting device 200 may select one of the first redundancy dynamic control mode and the second redundancy dynamic control mode based on a first reference pressure in which an estimated target pressure is set in advance (S7111, S7112).

When the estimated target pressure exceeds the first reference pressure, the auxiliary braking force adjusting device 200 may be configured for controlling the braking of the vehicle in the second redundancy dynamic control mode. That is, the auxiliary braking force adjusting device 200 may secure sufficient braking force while maintaining the stability of the vehicle using the second redundancy dynamic control mode.

When the estimated target pressure is lower than the predetermined first reference pressure, the auxiliary braking force adjusting device 200 may be configured to generate the braking force of the vehicle in the first redundancy dynamic braking mode.

The first redundancy dynamic braking mode may include a plurality of operations based on the target pressure, and the magnitude of the current applied for each operation may be set differently.

Referring back to FIG. 4, when the estimated target pressure is lower than the first predetermined reference pressure, the auxiliary braking force adjusting device 200 may confirm whether the estimated target pressure exceeds a preset second reference pressure (S7113).

When the estimated target pressure exceeds the preset second reference pressure, the auxiliary braking force adjusting device 200 may be configured to generate the braking force of the vehicle in the first redundancy dynamic braking mode of a third operation (S7114).

When the estimated target pressure is lower than the preset second reference pressure, the auxiliary braking force adjusting device 200 may confirm whether the estimated target pressure exceeds a preset third reference pressure (S7115).

When the estimated target pressure exceeds the preset third reference pressure, the auxiliary braking force adjusting device 200 may be configured to generate the braking force of the vehicle in the first redundancy dynamic braking mode of a second operation (S7116).

When the estimated target pressure is lower than the preset third reference pressure, the auxiliary braking force adjusting device 200 may be configured to generate the braking force of the vehicle in the first redundancy dynamic braking mode of the first operation (S7117).

Here, the auxiliary braking force adjusting device 200 may be configured for controlling the electronic control braking devices 701 and 702 using a table in which a current value to be applied to the electronic control braking devices 701 and 702 is set in advance for each operation. A table in which a current value to be applied to the electronic control braking devices 701 and 702 is set for each operation may be illustrated in Table 3 below.

TABLE 3

| First redundancy dynamic braking mode (ampere, A) | |
|---|---|
| First Operation | 1 |
| Second Operation | 2 |
| Third Operation | 3 |

The table with a current value to be applied to the electronic control braking devices 701 and 702 for each operation illustrated in Table 3 may be stored in the storage unit 500, and the auxiliary braking force adjusting device 200 may be configured for controlling the electronic control braking devices 701 and 702 using the table stored in the storage unit 500.

In other words, when the estimated target pressure is lower than a preset first reference pressure (e.g., 85 bars), the auxiliary braking force adjusting device 200 may be configured to generate the braking force of the vehicle in the first redundancy dynamic braking mode formed in the third operation.

When the estimated target pressure is less than the preset first reference pressure (e.g., 85 bars), the auxiliary braking force adjusting device 200 may confirm whether the estimated target pressure exceeds the preset second reference pressure (e.g., 60 bars).

When the estimated target pressure exceeds the preset second reference pressure (e.g., 60 bars), the auxiliary braking force adjusting device 200 may apply a third operation of the first redundancy dynamic braking mode and control a preset third-level current (e.g., 3 amperes (A)) to be constantly generated in the electronic control braking devices 701 and 702.

When the estimated target pressure is lower than the preset second reference pressure (e.g., 60 bars), the auxiliary braking force adjusting device 200 may confirm whether the estimated target pressure exceeds the preset third reference pressure (e.g., 40 bars).

When the estimated target pressure exceeds a preset third reference pressure (e.g., 40 bars), the auxiliary braking force adjusting device 200 may apply a second operation of the first redundancy dynamic braking mode and control a preset second-level current (e.g., 2 amperes (A)) to be constantly generated in the electronic control braking devices 701 and 702.

When the estimated target pressure is lower than the preset third reference pressure (e.g., 40 bars), the auxiliary braking force adjusting device 200 may apply a first operation of the first redundancy dynamic braking mode and control a preset first-level current (e.g., 1 ampere (A)) to be constantly generated in the electronic control braking devices 701 and 702.

The redundancy dynamic braking system according to an exemplary embodiment of the present disclosure may selectively apply the first redundancy dynamic braking mode and the second redundancy dynamic braking mode based on the target pressure, securing sufficient braking force while maintaining the stability of the vehicle using the electronic control braking devices 701 and 702.

Furthermore, the redundancy dynamic braking system according to an exemplary embodiment of the present disclosure may adjust the current applied to the first redundancy dynamic braking mode based on the target pressure, assigning linearity of the braking force generated by the electronic control braking devices 701 and 702, and improving response reactivity of the hydraulic braking devices 601, 602, 603 and 604.

The auxiliary braking force adjusting device 200 may confirm whether a redundancy dynamic braking mode termination condition is satisfied (S713).

Referring to FIG. 5, the redundancy dynamic braking mode termination condition may be determined based on a target pressure termination condition, a driving speed termination condition, failure of the wheel speed sensor, failure of the electronic control braking devices 701 and 702, and a road state during the driving of the vehicle.

The auxiliary braking force adjusting device 200 may terminate the redundancy dynamic braking mode when any one of the conditions for terminating the redundancy dynamic braking mode is satisfied.

The auxiliary braking force adjusting device 200 may confirm whether the target pressure termination condition is satisfied (S7131). The auxiliary braking force adjusting device 200 may be configured to determine that the target pressure termination condition is satisfied when the estimated target pressure is lower than a preset target pressure termination condition (e.g., 10 bars).

Here, the preset target pressure termination condition (e.g., 10 bars) is a preset and stored value, and may be a magnitude that can stably satisfy the target pressure with the first hydraulic braking devices 601 and 602.

Below a preset target pressure (e.g., 10 bars), sufficient braking force may be generated by the first hydraulic braking devices 601 and 602 before operating the electronic control braking devices 701 and 702, and accordingly, it may be meaningless to generate the braking force using the electronic control braking devices 701 and 702.

Accordingly, the preset target pressure termination condition may be set to include the same magnitude as the target pressure start condition, preventing the electronic control braking devices 701 and 702 from operating unnecessarily.

However, the present disclosure is not limited thereto, and the preset target pressure termination condition may be set to include a magnitude different from that of the target pressure start condition. For example, when the estimated target pressure fluctuates at the target pressure of the preset target pressure start condition and the preset target pressure termination condition, the redundancy dynamic control mode may repeatedly start and terminate. by setting the preset target pressure termination condition to a magnitude smaller than the target pressure start condition, the redundancy dynamic control mode may be made not to frequently repeat a start operation and a termination operation at the preset target pressure.

The auxiliary braking force adjusting device 200 may confirm whether a driving speed termination condition is satisfied (S7132). When the vehicle is driven in the dynamic braking mode when a driving speed is equal to or greater than a certain speed, the driving stability may be reduced due to the occurrence of spins in the vehicle, and the like.

Accordingly, the auxiliary braking force adjusting device 200 may receive the driving speed of the vehicle from the receiving unit 400, and check whether the received driving speed is equal to or greater than a preset driving speed termination condition (e.g., 80 kilometers per hour (km/h), terminating the redundancy dynamic braking mode.

Here, the preset driving speed termination condition (e.g., 80 km/h) is a value determined through a test drive and may be set differently depending on the vehicle.

The auxiliary braking force adjusting device 200 may confirm whether a wheel speed sensor has failed (S7133).

The wheel speed sensor may be used not only to estimate the driving speed of the vehicle, but also to determine a split road surface. Here, the auxiliary braking force adjusting device 200 may be configured to determine the road surface driven by the vehicle as a split road surface when a speed difference between the wheels provided on the left and right sides of the vehicle is equal to or greater than a preset value. When the vehicle is driving on the split road surface, the driving stability of the vehicle may be significantly reduced due to the occurrence of spins in the vehicle, and the like. Accordingly, when the wheel speed sensor used to determine the split road surface fails, the auxiliary braking force adjusting device 200 may not start the redundancy dynamic braking.

The auxiliary braking force adjusting device 200 may confirm whether the electronic control braking devices 701 and 702 have failed (S7134). The redundancy dynamic braking system 10 essentially utilizes the electronic control braking devices 701 and 702, thus checking whether the electronic control braking devices 701 and 702 operate normally. The auxiliary braking force adjusting device 200 may confirm whether the actuator of the electronic control braking devices 701 and 702 normally operates.

The auxiliary braking force adjusting device 200 may confirm whether a road state is a split road surface (S7135).

Here, the split road surface may be a road surface in which a difference in the size of wheel slips generated between a left wheel and a right wheel of the vehicle is equal to or greater than a certain size. When the vehicle is driving in the redundant dynamic braking mode on the split road surface, the driving stability may be reduced due to the occurrence of spins in the vehicle, and the like. Accordingly, when the road state is identified as the split road surface, the auxiliary braking force adjusting device 200 may terminate the redundancy dynamic braking mode.

The auxiliary braking force adjusting device 200 may terminate the redundancy dynamic braking mode when any one of the conditions for terminating the redundancy dynamic braking mode is satisfied.

On the other hand, the redundancy dynamic braking mode termination condition illustrated in FIG. 5 may be determined in an order of operations S7131, S7132, S7133, S7134 and S7135, but the present disclosure is not limited thereto, and the redundancy dynamic braking mode termination condition may be determined by changing the determination order of operations S7131, S7132, S7133, S7134 and S7135, or by placing the order of operations in parallel at the same time.

When the condition for terminating the redundancy dynamic braking mode is not satisfied, the auxiliary braking force adjusting device 200 may drive the vehicle in the redundancy dynamic braking mode and may confirm whether the longitudinal control is terminated (S715).

The auxiliary braking force adjusting device 200 may receive brake pedal stroke information received through the receiving unit 400, and when a brake pedal stroke occurs, the longitudinal control may be determined to have been terminated.

Furthermore, the auxiliary braking force adjusting device 200 may confirm whether the longitudinal control is terminated depending on whether there is a braking request from the autonomous driving controller 300. When there is no braking request received from the autonomous driving controller 300, the auxiliary braking force adjusting device 200 may be configured to determine that the longitudinal control is terminated.

When the redundancy dynamic braking mode termination condition is satisfied, the auxiliary braking force adjusting device 200 may release the electronic control braking devices 701 and 702 (S717).

In general, since the electronic control braking devices 701 and 702 are not provided with stroke sensors, an exact location of a pad for generating the braking force in the electronic control braking devices 701 and 702 may not be known. Accordingly, the electronic control braking devices 701 and 702 may be restored to a completely released state, easily controlling the electronic control braking devices 701 and 702 in the future as well as preventing an occurrence of drag.

Figure 7:
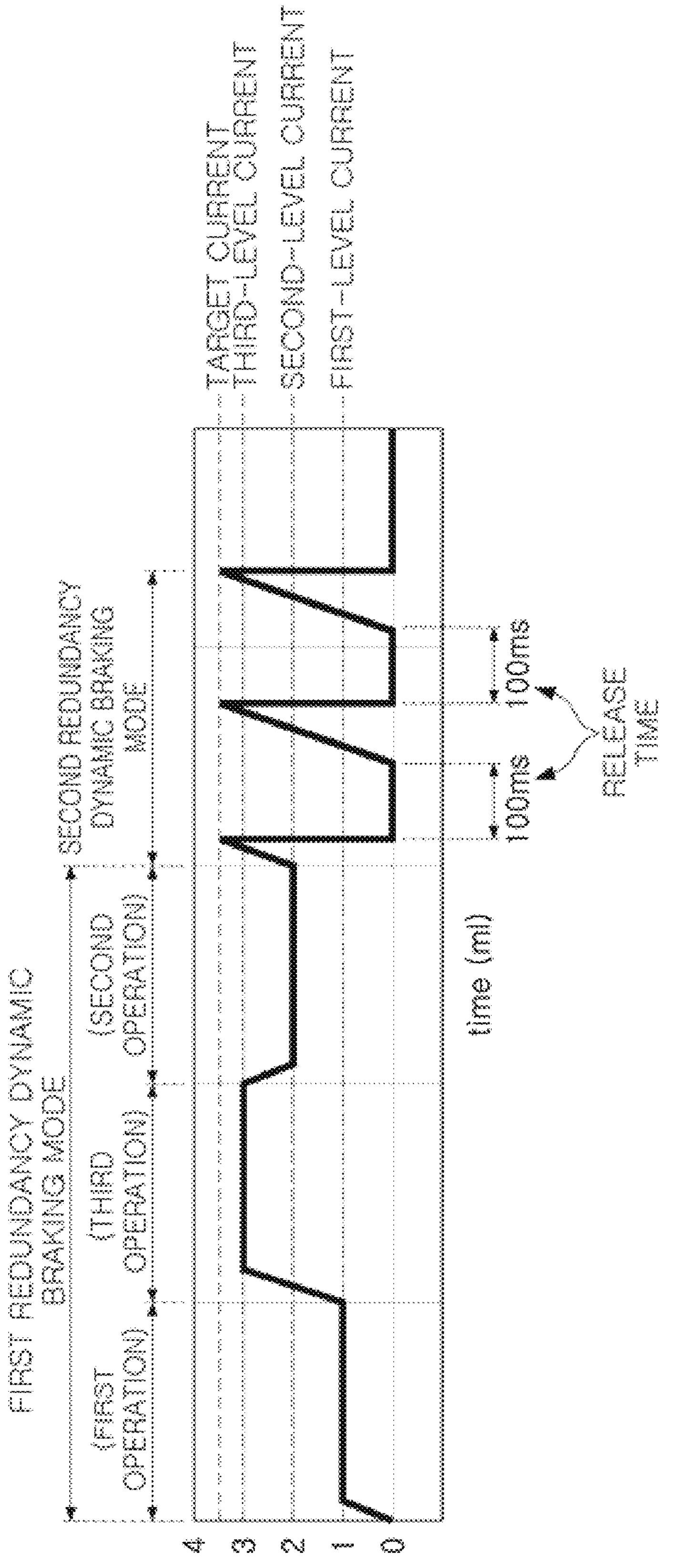
FIG. 7 is a view exemplarily illustrating a magnitude of a current over time applied to an electronic control braking device according to an exemplary embodiment of the present disclosure.

FIG. 7 is a view exemplarily illustrating a magnitude of a current over time applied to electronic control braking devices 701 and 702 according to an exemplary embodiment of the present disclosure.

Referring to a graph illustrated in FIG. 7, a first redundancy dynamic braking mode may be a mode in which a preset current is constantly applied to the electronic control braking devices 701 and 702 in each operation.

For example, the first redundancy dynamic braking mode may have three operations, and a current of 1 ampere (A) may be constantly applied in a first operation, a current of 2 amperes (A) be constantly applied in the second operation, and a current of 3 amperes (A) be constantly applied in a third operation.

In the first redundancy dynamic braking mode, when a current value applied to the electronic control braking devices 701 and 702 reaches a preset current value for each step, a corresponding current value may be maintained.

Referring back to FIG. 7, in a second redundancy dynamic braking mode, when the current value reaches the preset target current (e.g., 3.5 amperes (A)), the current may not be applied during a preset release time (e.g., 100 ms (e.g., milliseconds)).

The second redundancy dynamic braking mode may include a first operation of increasing the current applied to the electronic control braking devices 701 and 702 to the preset target current (e.g., 3.5 amperes (A)), and a second operation of not applying the current during a preset release time after the current applied to the electronic control braking devices 701 and 702 reaches the preset target current (e.g., 3.5 amperes (A)), and the first operation and the second operation may be repeated performed.

When a high current is continuously applied to the electronic control braking devices 701 and 702 in the first redundancy dynamic braking mode, the driving stability of the vehicle may be reduced due to an occurrence of excessive wheel slip, and the like.

Accordingly, when it is necessary to continuously apply the high current to the electronic control braking devices 701 and 702, current may be repeatedly applied by having a preset release time as in the second redundancy dynamic braking mode, generating the sufficient braking force by the electronic control braking devices 701 and 702 while securing the driving stability of the vehicle.

Methods according to an exemplary embodiment of the present disclosure may be implemented in a form of program instructions which may be performed through various computer means and may be recorded on a computer-readable medium. The computer-readable medium may include program instructions, a data file, a data structure alone or in combination. The program instructions recorded on the computer-readable medium may be specially designed and configured for the present disclosure or may be known to and usable by computer software technicians skilled in the art.

Examples of the computer-readable medium include hardware devices configured to store and perform program instructions, such as a ROM, a RAM, and a flash memory. Examples of the program instructions include machine language codes such as those generated by a compiler, as well as advanced language codes which may be executed by a computer using an interpreter and the like. The aforementioned hardware device may be configured to operate with at least one software module to perform the operation of the present disclosure, and vice versa.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore. "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A redundancy dynamic braking system comprising:

a main braking force adjusting device configured to control a hydraulic braking device of a vehicle;

a receiving unit configured to receive driving information of the vehicle;

an electronic control braking device configured to be operated electrically to generate braking force; and an auxiliary braking force adjusting device configured to control the hydraulic braking device and the electronic control braking device, in an event of a failure in the main braking force adjusting device, wherein the auxiliary braking force adjusting device is configured to control the electronic control braking device by adjusting a magnitude and an application time of a current applied to the electronic control braking device based on an estimated target pressure using the driving information, wherein the auxiliary braking force adjusting device is further configured to operate the electronic control braking device using at least two redundancy dynamic braking modes of adjusting the magnitude and the application time of the current applied to the electronic control braking device, wherein the at least two redundancy dynamic braking modes include:

a first redundancy dynamic braking mode of continuously applying a current of a predetermined magnitude to the electronic control braking device; and a second redundancy dynamic braking mode of discontinuously applying a current applied to the electronic control braking device, and wherein the auxiliary braking force adjusting device is further configured to:

in response to the estimated target pressure being lower than a predetermined reference pressure, operate the electronic control braking device in the first redundancy dynamic braking mode, and in response to the estimated target pressure being equal to or greater than the predetermined reference pressure, operate the electronic control braking device in the second redundancy dynamic braking mode.

2. The redundancy dynamic braking system of claim 1, wherein the hydraulic braking device includes:

a first hydraulic braking device provided in one of a front wheel and a rear wheel of the vehicle; and a second hydraulic braking device provided in another of the front wheel and the rear wheel of the vehicle, and wherein the auxiliary braking force adjusting device is further configured to directly control braking hydraulic pressure of the first hydraulic braking device, in the event of the failure in the main braking force adjusting device.

3. The redundancy dynamic braking system of claim 2, wherein the electronic control braking device is provided in another wheel provided with the second hydraulic braking device, and wherein the auxiliary braking force adjusting device is configured to generate a braking force using the first hydraulic braking device and the electronic control braking device, in the event of the failure in the main braking force adjusting device.

4. The redundancy dynamic braking system of claim 1, wherein the driving information includes at least one of a rotation speed of a wheel provided in the vehicle, a driving speed of the vehicle, and a stroke of a brake pedal provided in the vehicle.

5. The redundancy dynamic braking system of claim 1, wherein the electronic control braking device is an electronic parking brake (EPB).

6. The redundancy dynamic braking system of claim 1, wherein, assuming that the vehicle is braked with the hydraulic braking device, the target pressure is a total braking hydraulic pressure to be generated by the hydraulic braking device.

7. The redundancy dynamic braking system of claim 1, wherein the driving information includes stroke information of a brake pedal, and wherein the estimated target pressure is determined according to a stroke distance of the brake pedal.

8. The redundancy dynamic braking system of claim 7, further including:

a storage unit in which a table, including preset target pressures recorded according to the stroke distance of the brake pedal, is stored, wherein the auxiliary braking force adjusting device is further configured to determine the estimated target pressure using the table including the preset target pressure recorded according to the stroke distance of the brake pedal stored in the storage unit.

9. The redundancy dynamic braking system of claim 1, wherein the auxiliary braking force adjusting device is further configured to start redundancy dynamic braking in response to the estimated target pressure being equal to or greater than a predetermined reference target pressure, a driving speed of the vehicle is equal to or smaller than a predetermined reference driving speed, and a wheel speed sensor and the electronic control braking device are determined to be operating normally.

10. The redundancy dynamic braking system of claim 1, wherein the auxiliary braking force adjusting device is further configured to terminate dynamic braking in response to the estimated target pressure being lower than a predetermined reference target pressure, a driving speed of the vehicle is slower than a predetermined reference driving speed, a wheel speed sensor or the electronic control braking device is determined to have failed, or the vehicle is determined to be driving on a split road surface.

11. The redundancy dynamic braking system of claim 1, wherein the auxiliary braking force adjusting device connected to the main braking force adjusting device determines the failure of main braking force adjusting device by receiving a signal which decreases by a predetermined level or less, from the main braking force adjusting device.

12. The redundancy dynamic braking system of claim 1, wherein the first redundancy dynamic braking mode includes a plurality of operations of differently setting the magnitude of the current applied to the electronic control braking device based on the estimated target pressure.

13. The redundancy dynamic braking system of claim 1, wherein the second redundancy dynamic braking mode includes:

a first operation of applying a current to the electronic control braking device by a predetermined target current; and a second operation of releasing the electronic control braking device during a predetermined release time, wherein the first operation and the second operation are repeatedly performed.

14. A redundancy dynamic braking system comprises:

a main braking force adjusting device configured to control a hydraulic braking device of a vehicle;

an electronic control braking device configured to be operated electrically to generate braking force;

a receiving unit configured to receive driving information of the vehicle;

an auxiliary braking force adjusting device configured to control the hydraulic braking device and the electronic control braking device, in an event of a failure in the main braking force adjusting device; and an autonomous driving controller configured to control autonomous driving of the vehicle based on the driving information, wherein the auxiliary braking force adjusting device is configured to control the electronic control braking device by adjusting a magnitude and an application time of a current applied to the electronic control braking device based on an estimated target pressure, wherein the auxiliary braking force adjusting device is further configured to operate the electronic control braking device using at least two redundancy dynamic braking modes of adjusting the magnitude and the application time of the current applied to the electronic control braking device, and wherein the at least two redundancy dynamic braking modes include:

a first redundancy dynamic braking mode of continuously applying a current including a preset magnitude to the electronic control braking device in response to the estimated target pressure being lower than a preset pressure, and a second redundancy dynamic braking mode of discontinuously applying a current applied to the electronic control braking device in response to the estimated target pressure being equal to or greater than the preset pressure.

15. The redundancy dynamic braking system of claim 14, wherein the target pressure is estimated based on required deceleration received from the autonomous driving controller, and wherein, assuming that the vehicle is braked with the hydraulic braking device, the target pressure is a total braking hydraulic pressure to be generated by the hydraulic braking device provided in the vehicle.

16. The redundancy dynamic braking system of claim 14, wherein the auxiliary braking force adjusting device connected to the main braking force adjusting device determines the failure of main braking force adjusting device by receiving a signal which decreases by a predetermined level or less from the main braking force adjusting device.

17. The redundancy dynamic braking system of claim 16, wherein the first redundancy dynamic braking mode includes a plurality of operations in which the magnitude of the current applied to the electronic control braking device is set differently based on the target pressure.

18. The redundancy dynamic braking system of claim 16, wherein the second redundancy dynamic braking mode includes:

a first operation of applying a current to the electronic control braking device by a preset target current; and a second operation of releasing the electronic control braking device during a predetermined release time, wherein the first operation and the second operation are repeatedly performed.

* * * * *